United States Patent Office 3,734,887
Patented May 22, 1973

3,734,887
COMPOSITIONS OF POLYAMIDE OF 2,2,4-AND/OR 2,4,4-TRIMETHYLHEXAMETHYLENE DIAMINES AND EPOXY COMPOUNDS
Karl Schmitt, Herne, Fritz Gude, Wanne-Eickel, and Siegfried Brandt, Herne, Germany, assignors to VEBA—Chemie Aktiengesellschaft, Gelsenkirchen-Buer, Germany
No Drawing. Continuation of application Ser. No. 744,625, July 15, 1968. This application Sept. 21, 1970, Ser. No. 74,242
Claims priority, application Germany, July 21, 1967, Sch 41,040
Int. Cl. C08g 30/14
U.S. Cl. 260—47 EN                17 Claims

ABSTRACT OF THE DISCLOSURE

Plastic of polyamide of 2,2,4- and/or 2,4,4-trimethylhexamethylenediamine, and an epoxy compound. The plastic is useful for production of shaped articles and coatings.

This application is a continuation of application Ser. No. 744,625, filed July 15, 1968, now abandoned.

Homogeneous polyamides made from straight-chain diamines and dicarboxylic acids, aminocarboxylic acids and lactams, are partially crystalline. They are insoluble in most solvents and incompatible with other polymeric materials.

It is known that soluble polyamides can also be manufactured by the co-condensation of, for example, adipic acid, hexamethylene diamine and E-aminocaproic acid. These dissolve in alcohols and display a limited compatibility with other polymers, especially epoxy resins. In this way it is possible to make the polyamides react with these resins at relatively high temperature and produce new plastics having improved properties.

In order to obtain from a mixture of the two components hard plastics having good stability of shape and do so within a technically attractive short period of time, it is necessary to add epoxy resin hardeners, such as dicyanodiamide.

If the reaction of these copolyamides with epoxy reins is forced without hardeners at high temperatures, a cross-linking takes place at the amide groups (J. Appl. Polym. Sci., 8, 1287–95, 1964), the mixture becoming insoluble. The amount of cross-linking, however, is slight. The above-named resin combinations therefore have become known only as adhesives. However, it is not possible to react these known copolyamides with epoxy resins at low temperature.

The known polyamides made from dimerized fatty acids and polyamines which are usable for making shaped objects and coating, are yellow to brown colored substances, whose epoxy resin addition products are likewise colored.

It has been found that polyamides whose diamine component consists wholly or partially of 2,2,4- and/or 2,4,4-trimethylhexamethylenediamine (hereinafter called TMD) begin to react even at normal temperature with epoxy compounds which contain more than one epoxy group per molecule. The reaction products do not cross-link immediately, so that the mixtures are still fusible and soluble and can still be worked. They behave in this regard the same as the known mixtures of epoxy resins and polyamides of low molecular weight, which do not produce highly cross-linked, hard plastics until after some time. Polyamines of low molecular weight, however, have a high vapor pressure and are harmful to the health and consequently can be worked only if precautionary measures are taken.

In the case of the polyamides according to this patent application, the diamine component can be replaced up to 15% by diols. These diols are, for example, ethylene glycols, propylene glycols, butylene glycols, decane-diols, tridecane diols, etc., but also branched glycols such as 2,2-dimethylbutanediol, trimethylhexamethylene glycol, etc., or diols which simultaneously bear ether oxygen, such as triethylene glycol, dipropylene glycol, etc., and also mixtures of all these compounds.

The polyamides of TMD used according to the invention do not have the disadvantages of the prior art materials. Their mixtures with epoxy compounds produce plastics having outstanding technical properties. They are characterized by surface hardness, scratch resistance and flexibility. Particularly remarkable is the colorlessness of the addition products and their high surface gloss.

As it can be seen from the foregoing, the plastics according to the invention consist of two components. Component I is a polyamide of TMD, and Component II is an epoxy compound. The percentage of Component I amounts to 75–99.8%, unless the plastics are to be cross-linked only weakly or not at all, and 10–75% in the case of the more strongly cross-linked plastics, so that the percentage of Component I in this case lies between 10 and 99.8%. The best results are obtained with a TMD polyamide content between 50 and 97%. By the additional use of other aliphatic, araliphatic, aromatic or cycloaliphatic diamines in the polyamide, such as hexamethylenediamine, 1,4-diaminocyclohexane, the properties can be varied. The TMD content, however, is to amount to at least 10% of the amine content of the polyamide. The dicarboxylic acids contained in the polyamide have the general formula HOOC—R—COOH, R representing an aliphatic, aromatic or cycloaliphatic radical having 2 to 16 carbon atoms, such as adipic acid, 2,4,4-trimethyladipic acid, decanedicarboxylic acid, terephthalic acid or cyclohexane-1,4-dicarboxylic acid. Mixtures of these acids may also be present. Aminocarboxylic acids can be incorporated, even in the form of their lactams, such as, for example, E-aminocaproic acid or lauric lactam.

A particularly advantageous embodiment of the process according to the invention sets out from polyamides of low molecular weight having average molecular weights of less than 3000, their terminal groups being from 70 to 100% amino groups. On account of their low softening range and their good solubility, these can be mixed with the reactive resins at low temperatures, so that highly reactive epoxy resins can be used.

Addition products of high elasticity are obtained by the process of the invention when polyamides having molecular weights between 1500 and 10,000, and especially between 2000 and 7000 are reacted with epoxy resins.

The epoxy compounds that can be used as Component II have long been known. There are glycide ethers of polyvalent phenols that can be used, for example, such as the bisglycidyl ether of diphenylol propane and its polymers, glycidyl esters, e.g., of isophthalic acid, epoxidized hydrocarbons like vinylcyclohexenediepoxide, and glycidyl ethers of phenol formaldehyde resins. Mixtures of different epoxy compounds can also be used. Monoepoxy compounds may be included in small quantities. The properties of the shaped objects and coatings manufactured according to the invention can be varied by mixing them with fillers, pigments and plasticizers, in a known manner. The manufacture of the shaped objects and coatings is performed by mixing together the two Components I and II, in a solvent if desired, followed by fabrication by conventional procedures. Fillers can also be added to the mixtures, such as mineral and wood flour, glass fibers, and asbestos. The reaction can be accelerated by warming to 50–200° C. The addition of epoxy resin hardeners which activate Component II also accelerates the reaction.

These properties of the products according to the invention make it possible to use them in the manufacture of pure white or colorless, flexible and scratch-resistant adherent surface coatings and shaped objects.

This is not possible with the previously known polyamide-epoxy resin addition products. Although the commercial polyamides of dimerized fatty acids, when especially adjusted, produce flexible coatings, they are nevertheless yellowish to brownish in color and are not scratch resistant. Soluble polyamides of the nylon type react slowly at high temperature unless hardeners are added, and therefore they are not comparable, as regards fabrication, with the addition products of the invention.

The 2,2,4- and/or 2,4,4-diamines are alpha-omega diamines.

Percentages herein are in weight percent unless the context indicates otherwise.

EXAMPLE 1

A polyamide is prepared by prior-art methods from 1 part by weight of an isomer mixture composed of equal parts of 2,2,4- and 2,4,4-trimethylhexamethylene-diamine and 1 part by weight of decanedicarboxylic acid (1,10). 10 parts by weight of this polyamide are mixed with 7 parts by weight of an epoxy resin prepared from diphenylol propane and epichlorhydrin (epoxy number 0.36) by intensive kneading. The mixture is extruded to sheets 1 mm. thick, which rapidly harden between rolls heated to 150° C. The material is colorless, very flexible and scratch resistant.

EXAMPLE 2

42.5 parts by weight of adipic acid, 34.5 parts by weight of 1,9-nonanediamine and 23.0 parts by weight of 2,2,4-trimethylhexamethylenediamine are condensed to a polyamide by fusion condensation method.

10 parts by weight of this polyamide are mixed with 4 parts of an epoxy resin prepared from diphenylol-propane and epichlorhydrin (epoxy number 0.48) by intensive kneading. The mixture is rolled into sheets 0.5 mm. thick. The sheets are sandwiched with a linen fabric between them and hardened between hot rolls. The colorless sheet obtained is very flexible and scratch-resistant.

EXAMPLE 3

A polyamide is prepared from 52.2 parts by weight of sebacic acid, 4.0 parts terephthalic acid, 38.2 parts 2,4,4-trimethylhexamethylenediamine and 5.6 parts of hexamethylene diamine, by the fusion condensation mthod.

10 parts by weight of this polyamide are dissolved in 20 parts of ethanol. After the addition of 1 part by weight of the epoxy resin used in Example 2, the solution is refluxed for 2 hours.

Highly flexible articles made from PVC or rubber can be coated with this solution. After drying, a colorless, scratch-resistant coating is obtained.

EXAMPLE 4

A polyamide is made by the fusion condensation method from 38 parts by weight of adipic acid and 62 parts by weight of a technical isomeric mixture of 2,2,4- and 2,4,4-trimethylhexamethylenediamine.

10 parts by weight of this polyamide are dissolved in 20 parts by weight of methanol. The solution is mixed with 12 parts by weight of an epoxy resin made from diphenylol propane and epichlorhydrin and having an epoxy number of 0.51. Bright steel sheets are coated with this mixture and, after the solvent has been evaporated, they are heated for 1 hour at 80° C. The surface coating has a high gloss, and is hard and flexible.

EXAMPLE 5

26 parts by weight of a water-clear amide prepared from 1 mole of TMD and 1 mole of caprolactam and having a molecular weight of 270 are mixed with 74 parts by weight of an epoxy resin made on a basis of bisphenol A. The mixture is heated in a mold for 1 hour at 80° C. and for one hour at 150° C.

Mechanical properties of the specimens:

Notch impact toughness: 5.8 kp./cm.
Impact strength: no fracture.
Maximum bending tension: 1250 kp./cm.$^2$
Thermal stability of shape according to Vicat: 110° C.
The molded objects are entirely colorless.

What is claimed is:

1. Plastic consisting essentially of the reaction product of polyamide of dicarboxylic acids other than dimerized fatty acids and 1,2 epoxy compounds containing more than one epoxy group per molecule, the polyamide including diamine residues of at least one of aliphatic, araliphatic, aromatic, or cycloaliphatic diamine residues, residues of at least one of 2,2,4- and 2,4,4-trimethylhexamethylenediamine being 10 to 100% by wt. of the diamine residues, the polyamide being 10 to 99.8% by wt. of the polyamide plus epoxy compound on the basis of the reactants.

2. Plastic according to claim 1, the average molecular weight of the polyamide reactant being less than 3,000, and at least 70% of the terminal groups being amino groups.

3. Plastic according to claim 1, up to 15% of the diamine residues being replaced by aliphatic residues of ethylene glycol propylene glycol, butylene glycol, decane diol, tridecane diol, 2,2-dimethylbutanediol, trimethylhexamethylene glycol, triethylene glycol, dipropylene glycol or a mixture thereof.

4. Plastic according to claim 1, said reaction product being produced by reaction of the epoxy compound and amine at normal temperature to 200° C.

5. Plastic according to claim 1, the polyamide having an average molecular weight of less than 3000.

6. Molding compositon consisting essentially of polyamide and 1,2 epoxy compound containing more than one epoxy group per molecule, the polyamide including diamine residues of at least one of aliphatic, araliphatic, aromatic, or cycloaliphatic diamine residues, residues of at least one of 2,2,4- and 2,4,4-trimethylhexamethylenediamine being 10 to 100% by wt. of the diamine residues, the polyamide being 10 to 99.8% by wt. of the polyamide plus epoxy resin on the basis of said polyamide and epoxy compound.

7. Molding composition according to claim 6, the average molecular weight of the polyamide reactant being less than 3,000 and at least 70% of the terminal groups being amino groups.

8. Molding composition according to claim 6, the polyamide having an average molecular weight of less than 3,000.

9. Molding composition according to claim 6, up to 15% of the diamine residues being replaced by residues of ethylene glycol propylene glycol, butylene glycol, decane diols, tridecane diol, 2,2-dimethylbutanediol, trimethylhexamethylene glycols, triethylene glycol, dipropylene glycol or a mixture thereof.

10. Coating composition consisting essentially of polyamide and 1,2-epoxy compound containing more than one epoxy group per molecule, dissolved in an alcohol, the polyamide including diamine residues of at least one of aliphatic, araliphatic, aromatic, or cycloaliphatic diamine residues, residues of at least one of 2,2,4- and 2,4,4-trimethylhexamethylenediamine being 10 to 100% by wt. of the diamine residues, the polyamide being 10 to 99.8% by wt. of the polyamide plus epoxy resin on the basis of said polyamide and epoxy compound.

11. Coating composition according to claim 10, the average molecular weight of the polyamide reactant being less than 3,000, and at least 70% of the terminal groups being amino groups.

12. Coating composition according to claim 10, the polyamide having an average molecular of less than 3000.

13. Coating composition according to claim 10, up to 15% of the diamine residues being replaced by residues of ethylene glycol propylene glycol, butylene glycol, decane diols, tridecane, diol, 2,2-dimethylbutanediol, trimethylhexamethylene glycols, triethylene glycol, dipropylene glycol or a mixture thereof.

14. Plastic according to claim 1, wherein the epoxy compound is glycidyl ether of polyvalent phenol, glycidyl ester of isophthalic acid, epoxidized hydrocarbons, glycidyl ether of phenol formaldehyde resin, or a mixture thereof, the plastic being formed by heating of the polyamide and epoxy compound at up to 150° C.

15. Plastic according to claim 1, any diamine residues other than said trimethylhexamethylene diamine being at least one of hexamethylenediamine, 1,4-diaminocyclohexane, and 1,9-nonanediamine.

16. Molding composition according to claim 6, any diamine residues other than said trimethylhexamethylenediamine being at least one of hexamethylenediamine, 1,4-diaminocyclohexane, and 1,9-nonanediamine.

17. Coating composition according to claim 10, any diamine residues other than said trimethylhexamethylenediamine being at least one of hexamethylenediamine, 1,4-diaminocyclohexane, and 1,9-nonanediamine.

References Cited

UNITED STATES PATENTS 2,712,535   7/1955   Fisch _____ 260—47

OTHER REFERENCES

Chem. Abst., vol. 62, p. 13,244a, 1965.
Chem. Abst., vol. 66, p. 11,475, 1967.
J. of Applied Polymer Science, vol. 8, pp. 1287–1294, 1964.

WILLIAM H. SHORT, Primary Examiner

T. L. PERTILLA, Assistant Examiner

U.S. Cl. X.R.

117—127, 161 ZB; 161—184; 260—2 N, 9, 37 Ep, 33.4 Ep, 59, 78 A, 78 SC, 78.4 Ep, 830 TW